Figure 1:
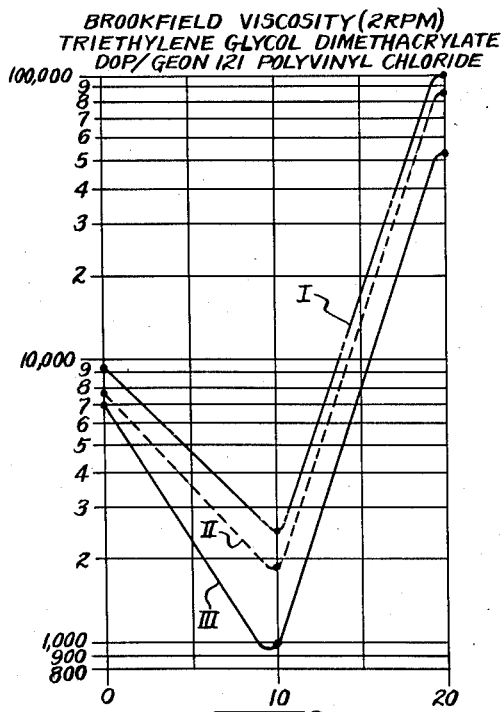

Nov. 27, 1962  J. A. CORNELL  3,066,110
POLYVINYL CHLORIDE PLASTISOL CONTAINING AN
ESTER PLASTICIZER AND TRIETHYLENE
GLYCOL DIMETHACRYLATE
Filed July 16, 1958

INVENTOR.
John A. Cornell
BY
ATTORNEY

United States Patent Office 3,066,110
Patented Nov. 27, 1962

3,066,110
POLYVINYL CHLORIDE PLASTISOL CONTAINING AN ESTER PLASTICIZER AND TRIETHYLENE GLYCOL DIMETHACRYLATE
John A. Cornell, Conshohocken, Pa., assignor to Sartomer Resins, Inc., Philadelphia, Pa., a corporation of Delaware
Filed July 16, 1958, Ser. No. 748,865
3 Claims. (Cl. 260—30.4)

The present invention relates to elastomers made from dispersions of finely divided vinyl chloride resins suspended in liquid plasticizers, commonly known as polyvinyl chloride plastisols, in which a liquid cross-linking agent consisting of triethylene glycol dimethacrylate acts to reduce the working viscosity of the plastisol when added in a critical amount of about 3% to about 12% by weight of the vinyl chloride polymer component of said plastisol.

In accordance with the invention, monomeric and polymeric solvent types of plasticizers may be employed, either alone or mixtures thereof. Typical monomeric plasticizers which may be employed include such esters as dioctyl phthalate, di-2-ethylhexyl phthalate, dicapryl phthalate, dibutyl adipate, dibutyl azelate, or sebacate, dioctyl adipate, azelate, or sebacate, trioctyl phosphate, alkyl diphenyl phosphates, e.g., 2-ethylhexyl diphenyl phosphate, etc. Typical polymeric types of plasticizers include condensates from dicarboxylic acids such as adipic, azelaic, or sebacic and alkylene glycols such as diethylene glycol and mixtures of diethylene glycol and glycerin.

A specific polymeric ester plasticizer material which has been found useful is paraplex G–60, sold by the Rohm & Haas Company, of Philadelphia, Pa. Paraplex G–60 is a clear, oily, light-amber-colored, thick liquid having a viscosity at 25° C. of 200 to 300 centipoises. It has a solidification temperature of 0° C., a flash point of 310° C. and a fire point of 340° C. It has a specific gravity at 25° C. of 0.9898, a refractive index at 25 C. of 1.4719, and an acid number of 1.0 mgm. KOH per gram.

Another material which may be used is a polymeric ester of diethylene glycol and adipic acid having the above viscosity.

Other useful ester plasticizers which may be included in the composition of the invention are methyl 9,10-epoxystearate, methyl 9,10-epoxy-12-hydroxy stearate, and other products obtained by epoxidation of oils such as soybean oil, linseed oil, etc., and a described by Findley et al. in 67 JACS 413, March 1945, and in U.S. Patents 2,458,484, 2,567,930, 2,569,502 and 2,485,160.

Non-solvent plasticizers, such as tetraethylene glycol di-2-ethyl hexoate and methoxyglycol acetyl ricinoleate may also be employed in minor amounts, i.e., up to 40% of the above solvent type monomeric and polymeric plasticizers, as part of the liquid dispersant for the polyvinyl chloride resin.

Another type of plasticizer which may be employed is stabilized methyl esters of polychloro fatty acid compositions, particularly methylpentachlorostearate which is stabilized with ester-type compounds in monomeric or polymeric form which are esters of fatty acids containing one or more double bonds and/or one of more epoxide groups. See patent to Robitschek et al., No. 2,731,431. The polymeric ester plasticizers may also be used with other esters.

The plasticizer or mixture of plasticizers is selected, in accordance with the invention, to give good wetting and dispersing action without solution of resin at low temperatures, and with fusion of the resin-plasticizer mixture at elevated temperatures, the resin becoming solvated. The plasticizer combination will, to an important extent, determine flow properties and the properties of the fused product.

In Patent No. 2,618,621 to Burt, there are disclosed plastisol compositions containing 40% to 60% of polyvinyl chloride resin and 60% to 40% of liquid dispersant for said resin, said dispersant consisting of a mixture of 10–80% of polyethylene glycol methacrylate diester based on liquid and the remainder of the dispersant being the liquid ester plasticizer.

It has been discovered that, uniquely, triethylene glycol dimethacrylate in critical amounts of from about 3 parts to about 12 parts per 100 parts of polyvinyl chloride resin exerts a sufficient viscosity depressing effect on plastisol formulations containing from about 18% to about 37.5% of plasticizer and viscosity depressing agent, the remainder being polyvinyl chloride resin, to make these very high vinyl chloride paste resin plastisol compositions useful for applications where they could not be employed heretofore. Significantly the critical amounts of triethylene glycol dimethacrylate employed with plastisols having resin to liquid dispersant proportions of 82–62.5% resin and 18–37.5% of liquid dispersant does not provide any change in hardness of these cured plastisols as compared with the same plastisol composition in which the viscosity depressing agent in the amount employed is absent from the plastisol compositions.

Accordingly, the viscosity depressing action of the triethylene glycol dimethacrylate viscosity reducing agent of the invention has been found to be uniquely adapted to provide usable plastisol compositions at high vinyl resin low liquid dispersant ratios for purposes which have heretofore been found very desirable but for which the usual types of viscosity depressant agents have not been found to be satisfactory.

An advantage of the invention is the immediate achievement of low working viscosity plastisols which make the high paste resin plastisols immediately usable with certain vinyl chloride polymers such as Geon 121. No decrease in hardness is encountered when a minimum of plasticizer is used and the low viscosity is maintained for prolonged periods of storage, i.e., up to one week and longer, without encountering any substantial increase in viscosity of stiffness.

Triethylene glycol dimethacrylate, as compared with other agents under the series of methacrylate diesters of polyethylene glycol, reduces rather than increases the viscosity or stiffness of the working plastisol initially or on standing up to one day and longer as in Table I below.

TABLE I

*Effect of Cross-Linking Agent Addition on Viscosity of Plastisol Consisting of 100 Parts of Polyvinyl Chloride (Geon 121), 60 Parts of Di(2 Ethylhexyl Phthalate), 2.3 Parts of Advastab 671*

A. TRIETHYLENE GLYCOL DIMETHACRYLATE

|  | Percent Liquid Cross-Linker | Brookfield Viscosity in Centipoises | | | |
|---|---|---|---|---|---|
|  |  | 2 r.p.m. | 4 r.p.m. | 10 r.p.m. | 20 r.p.m. |
| Initial Viscosity | 0 | 7,000 | 6,150 | 5,200 | 4,690 |
| Do | 3 | 3,520 | | | |
| Do | 5 | 2,200 | | | |
| Do | 10 | 1,000 | 900 | 800 | 710 |
| Do | 15 | 10,000 | | | |
| Do | 20 | 53,000 | 40,000 | 28,700 | 23,000 |
| Viscosity after 24 hrs | 0 | 7,800 | 7,200 | 6,400 | 6,050 |
| Do | 3 | 5,000 | | | |
| Do | 5 | 3,650 | | | |
| Do | 10 | 1,900 | 1,700 | 1,460 | 1,350 |
| Do | 15 | 15,500 | | | |
| Do | 20 | 85,000 | 66,250 | 49,100 | 40,300 |
| Viscosity after 7 days | 0 | 9,300 | 8,850 | 7,920 | 7,520 |
| Do | 3 | 6,000 | | | |
| Do | 5 | 4,500 | | | |
| Do | 10 | 2,400 | 2,100 | 1,800 | 1,700 |
| Do | 15 | 21,000 | | | |
| Do | 20 | 130,000 | 82,500 | 60,300 | 48,250 |

B. TETRAETHYLENE GLYCOL DIMETHACRYLATE

| Initial Viscosity | 0 | 7,000 | 6,150 | 5,200 | 4,690 |
|---|---|---|---|---|---|
| Do | 5 | 6,700 | 5,950 | 5,100 | 4,600 |
| Do | 10 | 6,400 | 5,750 | 5,000 | 4,500 |
| Do | 20 | 53,500 | 42,650 | 30,300 | 24,400 |
| Viscosity after 24 hrs | 0 | 7,800 | 7,200 | 6,400 | 6,050 |
| Do | 5 | 7,950 | 7,400 | 6,600 | 6,230 |
| Do | 10 | 8,100 | 7,600 | 6,800 | 6,390 |
| Do | 20 | 92,500 | 72,000 | 57,000 | 46,500 |
| Viscosity after 7 days | 0 | 9,300 | 8,850 | 7,920 | 7,520 |
| Do | 5 | 10,600 | 9,900 | | |
| Do | 10 | 12,000 | 10,700 | 9,280 | 8,800 |
| Do | 20 | 98,000 | 77,000 | 57,000 | 46,500 |

C. DUROMETER "D" HARDNESS VALUES ON ADDITIONS OF TRIETHYLENE GLYCOL DIMETHACRYLATE TO 100 PARTS OF GEON 121 WITH DI (2 ETHYLHEXYL PHTHALATE) PLASTICIZER AND 2.3 PARTS OF ADVASTAB T671 STABILIZER

| Plastisol Composition | Durometer D Hardness (Maximum instantaneous) |
|---|---|
| Control: 100 pts. Geon 121; 60 pts. DOP; 2.3 pts. stabilizer | 31 |
| 3 p.p.h. of TEDMA: 100 pts. Geon 121; 57 pts. DOP; 2.3 pts. stabilizer; 3 pts. TEDMA | 34 |
| 5 p.p.h. of TEDMA: 100 pts. Geon 121; 55 pts. DOP; 2.3 pts. stabilizer; 5 pts. TEDMA | 36 |
| 10 p.p.h. of TEDMA: 100 Geon 121; 50 pts. DOP; 2.3 pts. stabilizer; 10 pts. TEDMA | 43 |
| 10 p.p.h. of TEDMA: 100 pts. Geon 121; 60 pts. DOP; 2.3 pts. stabilizer; 10 pts. TEDMA | 32 |
| Control: 100 pts. Geon 121; 50 pts. DOP; 2.3 pts. stabilizer | 42 |

Under Table I above, it is noted that the two factors of viscosity and hardness are controlled in a significantly different manner by the addition of between about 3 and about 12 parts of triethylene glycol dimethacrylate as compared with the addition of tetraethylene glycol dimethacrylate which is recommended as the preferred cross-linking agent in the patent to Burt, 2,618,621.

In the figures of the drawings, the Brookfield viscosity is plotted as the ordinant on a semi-logarithmic scale against the addition of viscosity depressant as the abscissa, the abscissa being scaled on a regular or geometric scale.

FIG. 1, curve I, illustrates the variation of Brookfield viscosity measured at 2 r.p.m. of the Brookfield spindle for the addition of the triethylene glycol dimethacrylate viscosity depressant to a plastisol containing 100 parts of Geon 121, 60 parts of di(2 ethylhexyl phthalate), and 2.3 parts of dibutyl tin laurate (Adverstab 671, made by Advance Solvents and Chemical Corp.). The parts of the viscosity depressant added (0–20) are based upon 100 parts of Geon 121 polyvinyl chloride. The viscosity reading of curve I is the initial viscosity reading. Curve II represents the viscosity values observed after 24 hours, and curve III represents the viscosity values observed when the preparations have stood for one week with the specified Geon formulation.

Figure 2:
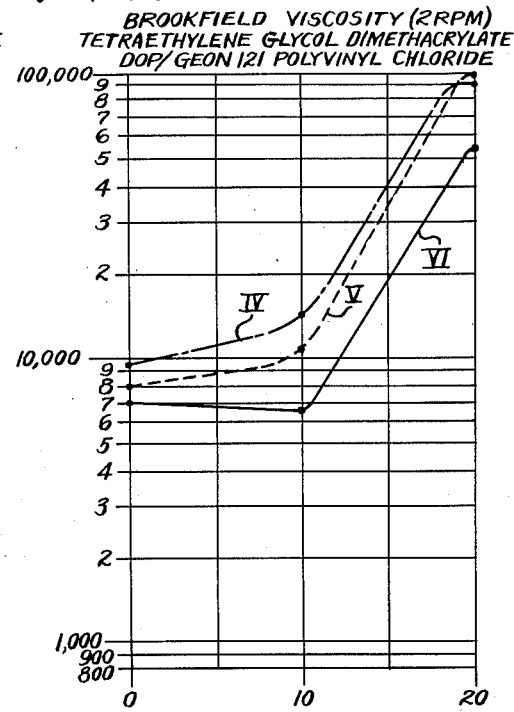

In FIG. 2, the viscosity depressant agent is tetraethylene glycol dimethacrylate and is added to the same formulation as in FIG. 1 (proportions of from 0–20 parts of viscosity depressant per 100 parts of Geon 121 polyvinyl chloride). Curves IV, V, and VI illustrate the results which are observed by the addition of similar amounts. Curve IV represents the initial viscosity, curve V the viscosity after 24 hours, and curve VI the viscosity after one week. No depressant action is observed.

Figure 3:
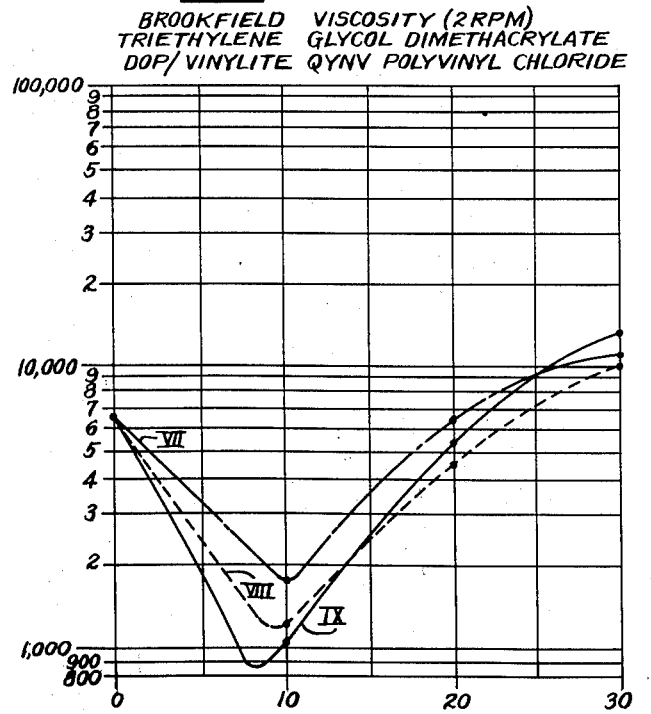

In FIG. 3, curve VII represents the initial viscosity observed with addition of Vinylite QYNV (of polyvinyl) chloride to the same composition. Curve VIII represents the addition of the 24 hour viscosity values for QYNV, and curve IX represents the viscosity values after one week.

First, the viscosity, as measured by Brookfield Synchro-Lectric Viscometer Model RVF, decreases to a value of about 50% of the initial viscosity upon the addition of 3 parts of triethylene glycol dimethacrylate per 100 parts of resin in a plastisol consisting essentially of 100 parts of Geon 121 and 60 parts of commercial dioctyl phthalate plasticizer. The addition of 3 parts of triethylene glycol dimethacrylate per 100 parts of resin in the mixture of 100/60 resin to plasticizer also causes an increase in hardness from durometer D rating of 31 to durometer D rating of 34.

At 5 parts of the liquid cross-linking agent of the invention per 100 parts of Geon 121, the Brookfield viscosity drops to a value of 2200 centipoises and at 10 parts cross-linker per 100 parts of resin, the Brookfield viscosity drops to a value of 1000 centipoises. As shown in FIG. 1, at about 10 parts of liquid cross-linking agent per 100 parts of resin, the maximum viscosity drop is achieved.

As shown in Section C, Table I, under Durometer D Hardness Rating, the durometer D rating at minimum viscosity, 10 parts cross-linking agent per 100 parts of Geon 121 has a value of 43. This value of durometer $D=43$ is to be compared with a durometer D rating of about 42 which is observed with a plastisol containing 100 parts of Geon 121 resin and 50 parts of dioctyl phthalate. Thus it is seen that the effect of the addition of the liquid cross-linking agent of the invention is to provide the same hardness as would be achieved without the liquid cross-linking agent and with the amount of dioctyl phthalate plasticizer which remains in the plastisol. Stated in other words, if 10 parts of liquid cross-linking agent are added, essentially the same hardness occurs as would be obtained if the liquid cross-linking agent were not added.

Thus, in the sense of increasing hardness, by using the liquid cross-linking agent of the invention, we can estimate the hardening effect of the liquid cross-linking agent of the invention as representing an increase in dispersion resin solids by giving a correspondingly higher hardness resulting from a corresponding decrease in plasticizer used to obtain a particular low viscosity and hence a decrease in extractables of the cured elastomer.

The storage stability of the lower viscosity of working composition in accordance with the invention is also illustrated in Table I wherein it is indicated that in respect to Geon 121 stir-in paste resin, that initial viscosity values rise only by an amount of about 10% after 24 hours and by an amount of about 25–30% upon standing for 7 days. This high order of storage stability which permits the maintenance of controlled low viscosity is believed to be due to the insolubility of a larger particle grade of polyvinyl chloride resin which is typified by Geon 121. The particle size of Geon 121 and its chemical and physical characteristics are such as to permit contact at room temperature with substantial quantities of plasticizer without any substantial viscosity change on long standing.

The relatively good storage stability of Geon 121 is to be compared with the less desirable storage stability of QYNV which is obtained from Bakelite Division of Union Carbide Corporation. Resin QYNV is a stir-in plastisol paste resin having a similar particle size as Geon 121, i.e., particles greater than 0.4 micron, average particle size being 0.6–0.9 micron, with a particle size distribution to limit the initial solvation of the polymer by plasticizer. Although QYNV at room temperature has substantially the same intrinsic viscosity value, i.e., 1.58 measured in cyclohexanone at 20° C., and similar solubility properties in the common plasticizers utilized in the plastisol formulations, it does increase in viscosity with plasticizer and viscosity modified on standing. Differences in chemical and physical properties which modify the particles of polyvinyl chloride might exist which cause observed differences in storage stability. It has been observed that the addition of 3 parts, 5 parts, 10 parts, and 12 parts of the same liquid cross-linking agent of the invention provide the same initial drop in viscosity as is observed when the resin selected is Geon 121, but the sample of QYNV formulation tested must be used within 24 hours or otherwise the viscosity will rise with passing time and make the composition unsuitable for the intended purpose.

Similar instability was observed in the sample of QYNV which was tested when corresponding amounts of tetraethylene glycol dimethacrylate were employed.

Under part B of Table I, there is illustrated the viscosity behavior observed when similar amounts of tetraethylene glycol dimethacrylate were employed with Geon 121. The addition of 5 parts of tetraethylene glycol dimethacrylate depressed the initial viscosity of the mixture by only about 5% whereas the addition of the same amount of triethylene glycol dimethacrylate under part A of Table I depressed the viscosity by the amount of 50%, i.e., a tenfold decrease. The degree of decrease in viscosity of about 5% is substantially insignificant since in practical terms it does not provide sufficiently improved fluidity to permit a significant working advantage for molding or knife cutting operations in instances where highly viscous plastisols must be modified.

At 10 parts per 100 addition of tetraethylene glycol dimethacrylate, the decrease in initial viscosity is only about 8;10%, whereas the addition of 10 parts per 100 of triethylene glycol dimethacrylate causes a decrease of about 70% of the initial viscosity in attaining a viscosity which is less than one-third of the original.

The addition of 20 parts of tetraethylene glycol dimethacrylate per 100 parts of resin causes an increase in viscosity from a value of about 7000 centipoises to a value of about 53,000 centipoises.

As is seen by comparing the graph of FIG. 2 with the graph of FIG. 1, which illustrates addition of tetraethylene glycol dimethacrylate based upon the data summarized in Table I hereinabove, up to 12 parts per 100 concentration of liquid cross-linking agent for these two materials illustrates a significant decrease in viscosity with the cross-linking agent of the invention and in contrast to an increase in viscosity with a cross-linking agent which applicant considered to be equivalent as represented in the prior art, Burt Patent 2,618,621.

In contrast to the recommended practice of adding a free radical polymerization catalyst to accelerate hardening at elevated temperatures when larger amounts of the hardening agent are employed in the plastisol, the addition of such catalysts as exemplified by benzoyl peroxide is not necessary and an equivalent result is obtained when the viscosity reducing agent acting as hardener at elevated temperatures is employed in the absence of such catalysts.

In actual practice, it has been determined that compositions containing about (40 to) 60 percent by weight of polyvinyl chloride resin, about (60 to) 40 percent by weight of plasticizer as described in the Burt patent, and about 20 parts of triethylene glycol dimethacrylate hardener replacing a corresponding amount of plasticizer in the Burt formulation, result in a stiffening or increase in viscosity to reach a value ten times that of the equivalent composition with plasticizer above about 80,000 centipoises after standing from 2 days to about a week, while the equivalent composition with plasticizer alone had a viscosity of 8,000.

In contrast to this behavior, the addition of about 3 to about 8 percent by weight of plasticizer, triethylene glycol dimethacrylate, in plastisol formulations containing about 60 percent or upwards of polyvinyl chloride resin including polyvinyl resin of the stir-in type and plasticizer modified as hereinabove stated, results in depression of the viscosity to a value of about half that of the plastisol using plasticizers alone or less both initially and when the compositions are permitted to stand for equivalent lengths of time.

In preferred plastisol compositions of the present invention, vinyl chloride dispersion polymers of the stir-in or coarser type are employed, e.g., Geon 121, Exon 654, or Vinylite QYNV, and preferably blended with polyvinyl chloride dispersion polymers, e.g., Geon 202, having a coarser particle size to permit a substantial reduction in the amount of plasticizer required to provide paste resins for convenient handling in the manufacture of molded and cast articles. A preferred paste resin for semi-rigid elastomers is a mixture of Geon 121 and Geon 202.

Geon 202 is a vinyl chloride-vinylidene chloride copolymer containing from 65–85% of vinyl chloride, from 35–15% of vinylidene chloride, made by B. F. Goodrich Chemical Company, having a specific gravity of 1.41 and a specific viscosity of 0.40 (0.4% solution in nitrobenzene at 20° C.) and in dry form an average particle size of at least 0.7 micron. Geon 121 is a polyvinyl chloride resin made by this same manufacturer; it has a specific gravity of 1.40 and a specific viscosity of 0.67 (0.4% solution in nitrobenzene at 20° C.).

A preferred stir-in polyvinyl chloride resin is one which has a vinyl chloride content of at least 91%, more preferably above 97%, a high molecular weight as evidenced by specific viscosity value of 0.57 to 0.67 as measured in cyclohexanone, and which may contain in addition to polyvinyl chloride a co-monomer such as vinylidene chloride, ethyl acrylate, acrylonitrile, vinyl acetate, or butyl methacrylate.

As the particle size of the polyvinyl chloride is increased, the fluidity of plastisols prepared therefrom is increased. Thus, a polymer having a particle diameter of 0.4 micron gives a plastisol of relatively high viscosity (ca. 50,000 to 100,000 centipoises at 25° C.) in a 60/40 blend of resin and di(2-ethylhexyl) phthalate, whereas a stir-in resin having a particle diameter of 0.8 micron gives a low viscosity plastisol (ca. 4,000–10,000 centipoises at 25° C.) in a similar 60/40 blend of resin and plasticizer. The plastisol prepared from the 0.4 micron resin has too high a viscosity and is useless for most plastisol applications, whereas the plastisol prepared from the 0.8 micron resin can be readily used for any application. Particle diameters referred to herein are average particle diameter measurements based on the area of the particles. Accordingly, particle sizes of the polyvinyl chloride resin are at least 0.6 and preferably above 0.8 micron.

The viscosity depressing agent in accordance with the invention is particularly useful with high paste resin-low liquid dispersant compositions intended for coating application, slush molding application, flexible rotational molding application and rigid rotational molding application.

In coating applications, such as reverse roller coating applications, it is required that the viscosity of the plastisol be less than about 6,000 centipoises and possess a low yield value in order to transfer suitable thickness of pigmented plastisol film by printing from coating paper to the flexible base material.

Example I of the instant application illustrates a composition particularly adapted to be roller coated by the reverse roller coating procedure and provide coated products having good hand and drape, no tack, good flame resistance, good low temperature flexibility and good tear resistance. A significant feature of the illustrative coating composition in Example I is the complete elimination of mineral spirits, water soluble viscosity depressants and volatile ketone solvents which are usually required in plastisol coating compositions. The viscosity depressing agent of the present invention is sufficiently active to reduce the viscosity of the plastisol in the absence of solvent or volatile diluents to a value well below the maximum which is dictated by considerations of equipment, roller application, production capacity. At the same time, the hazards of use of volatile, flammable diluents is completely eliminated. The viscosity reducing agent of the present invention represents a liquid material which is readily converted into the solid state during fusion and solvent elimination problems which give rise to surface imperfections in the applied coating are eliminated. A more economical coating is produced since it is based upon a higher proportion of cheap vinyl resin polymer than with the usual 50/50 plastisol employed.

Elimination of excessive amounts of plasticizer permitted by the viscosity depressing agent of the invention provides a product more resistant to solvent attack and at the same time more resistant to water because of the elimination of water soluble additives.

Fusion of the high value chloride polymer pastes of the present invention is carried out at temperatures above about 100° C. and the application of heat brings about an irreversible fusion solution of the plasticizer with the resin.

At an early stage in the fusion process, there is observed the formation of a gel or gelled paste having a cheesy texture, low tensile strength and dull surface. By increasing the temperature for fusion to about 175° C., the surface becomes more glossy, the cheesy texture is transformed into an elastomeric texture and the physical properties, particularly hardness and tensile strength, are enhanced.

Due to inherent sensitivity of vinyl chloride polymer to elevated temperature resulting in development of color and decrease in flexibility, stabilizers are included in the plastisol composition. Stabilizers which are usable include metallic oxides such as oxides of lead, barium, cadmium, etc., metallic soaps such as lead soaps, barium soaps, cadmium soaps, and calcium soaps, and organometallic compounds such as dibutyl tin laurate, cadmium lauryl mercaptide, dibutyl tin maleate, etc.

Basic lead sulfate, basic lead phthalate, and basic lead phosphite are useful in instances where electrical insulation is being prepared and very high heat stability is required; these stabilizers can cause discoloration if subjected to long outdoor exposure and, accordingly, formulations are pigmented for this use.

These materials have the advantage of acting in two capacities, e.g., as ultraviolet light absorbers and improving flame resistance.

The metallic soaps such as calcium stearate, calcium ricinoleate, barium ricinoleate and cadmium 2-ethyl hexoate act as hydrogen chloride adsorbers and thereby scavenge hydrogen chloride split out from the polyvinyl chloride paste material when subjected to high temperatures.

Under the influence of light exposure for prolonged periods of time, vinyl plastisols tend to become oxidized and discolor to form color-producing polyene systems. Although certain stabilizers such as dibasic lead phosphite function as heat stabilizers and light stabilizers, light stability may be improved by adding 1 percent or more of ultraviolet adsorbers such as lead salicylate or strontium 2-ethyl hexoate. Maleate and fumarate stabilizers such as are disclosed in Patent 2,681,900 also may be used as light stabilizers.

The stabilizers above are used in amounts of from 0.5 to 5 percent of the total composition.

Pigments also serve to impart stability against sunlight and such pigments as carbon black, titanium dioxide, magnesium phosphate, magnesium silicate, zinc oxide, and anhydrous tribasic lead sulfate may be employed.

Plasticizers which contain 1,2 oxirane functionality also serve as hydrogen chloride scavengers and thereby exercise a heat stabilizing function. Examples here are octyl epoxy stearate, epoxidized peanut oil, epoxidized soya oil, epoxidized diaceto glycerides, etc.

Fillers are added to the vinyl chloride polymer pastes of the invention in order to increase hardness, reduce surface tack, bring about certain flow properties during processing and to reduce cost. The quantity of filler employed is generally up to 20 parts filler per 100 parts of plastisol but excessive loading of the plastisol with filler must be avoided since tensile strength is impaired and "crease-whitening" may be encountered.

Water adsorptive fillers such as wood flour cannot be used because the adsorbed moisture tends to cause blistering during fusion. In general, the particle size of fillers is preferably about 5 to 10 microns, the smaller size fillers contributing greater abrasion resistance. Thus, fine and fibrous fillers may be incorporated in the composition of the invention, either alone or mixtures thereof. Ground limestone, serpentine, talc are examples of the fine fillers which may be employed. Fibrous fillers which may be used are asbestos, fibrous talc, etc.

Organic and inorganic pigments in amounts up to 5 percent of the total composition may be used. Titanium oxide, carbon black, iron oxide, chrome orange, and ochre are among the inorganic species which can be added to obtain a desired color effect. Phthalocyanine green and phthalocyanine blue are examples of organic pigments which may be employed.

Pigments and fillers are preferably added as predispersed pastes. In order to permit easier handling by unskilled personnel, the addition of the triethylene glycol dimethacrylate viscosity depressing agent is preferably carried out by using a solvent ester plasticizer as a carrier therefor. The preferred carrier may be one of di-2-ethylhexyl phthalate, di-2-ethylhexyl adipate and di-isooctyl adipate, an amount of carrier being employed which is from about 20 percent to about 80 percent of the addition of the additive composition for viscosity depressant action.

Thus, in a typical illustrative example of viscosity depressant addition, one may desire to add a total of 10 parts of triethylene glycol dimethacrylate viscosity depressant to a plastisol composition containing 80 parts of 99+ percent polyvinyl chloride stir-in resin and 20 parts of di-2-ethylhexyl adipate. The paste is formed by stirring the vinyl chloride particles portionwise into the plasticizer and the mixing process is assisted by adding the viscosity depressant in 50 percent concentration in di-2-ethylhexyl adipate, the mixing being carried out by progressively wetting the additions of resin particles with plasticizer until all of the ingredients in the correct proportions are added. The use of the viscosity depressant in plasticizers represents a convenient commercial form useful for the formulation at dilutions of 40%, 50%, 67%, 80% and 90% of the active agent to make formulating easier.

Pigments and fillers are preferably added in predispersed form after a smooth paste is achieved. The initial viscosity of the composition after the depressant is added is about 70 percent less than that which would be observed in the absence of the viscosity depressing agent of the invention.

It is desirable, under certain circumstances where the plastisol composition is to be kept at elevated temperatures below the fusion point for substantial periods prior to fusion, that there be present a stabilizer which will prevent thermal polymerization of the triethylene glycol dimethacrylate viscosity depressant at temperatures below about 150° F. but which will become inactivated at the fusion temperature of the polyvinyl chloride-plasticizer, e.g., about 300–400° F. and permit the hardening of the mixture to take place. Although up to 100 parts per million of hydroquinone are present to stabilize the dimethacrylate viscosity depressant for ordinary handling, hydroquinone is inactivated at low temperature. It is desirable to use a stabilizer which is more active at elevated temperatures; such stabilizers as organic amines and organic sulfides are used in amounts of from 50 to 450 parts per million of the liquid dispersant. Organic amines include volatile amines such as diethylene triamine, triethylene tetramine, tertiary octylamine and less volatile amines, e.g., dimethyl cyclohexylamine, dimethyl aniline, dicyclohexyl methylamine, metaphenylene diamine, or organic sulfides such as diethyl sulfide, dibutyl sulfide, di-2-ethylhexyl sulfide, diphenyl sulfide and dipentamethylene thiuram tetrasulfide. These stabilizers may be used in lieu of hydroquinone and are preferred in proportions of from about 60 to about 150 parts per million of liquid dispersant.

An advantage of volatile stabilizers lies in the fact that they have sufficient volatility to evaporate from the fusion mixture prior to completing the cure of the elastomeric plastisol for the attainment of the desired physical properties. The preferred stabilizer for the purpose is dimethyl cyclohexylamine. It is not essential, however, that the stabilizer be volatile at temperatures above 125° C. since the stabilizing action of a non-volatile amine or sulfide as in the case of metaphenylene diamine or diphenyl sulfide may occur through the transformation of the stabilizer into an inactive non-stabilizing compound.

A valuable embodiment of the invention are light weight products which are attained by employment of foaming agents. The composition of the invention may be employed in expanded or cellular form where a product of lower density is desirable. "Porofor N" is an example of a nitrogen liberating blowing agent which may be employed, releasing nitrogen at a temperature above room temperature at which molding is accomplished. Other nitrogen liberating blowing agents which may be employed are diazo amino benzene, azo isobutyric dinitrile, dinitroso pentamethylene tetramine, diethyl azo isobutyrate, 1,3-bis (xenyl)-triazine, etc.

The foregoing plastisol foams made under atmospheric pressure result in open cell structures. If a closed cell sponge of vinyl chloride polymers is desired for special properties, e.g., buoyancy or insulation, plastisol is blown in a closed mold under pressure and the recommended commercial procedure is followed in that the product is given post-fusion treatment, at temperatures of about 120° C. Foamed structures can advantageously be formulated so as not to support combustion and in this instance, it is desirable to employ flame retarding agents. As mentioned above, phosphite and phosphate stabilizers impart flame resistance but this may be enhanced by adding antimony oxide in amounts of up to 15 parts per 100 parts of formulation. In instances where the fused semi-rigid plastisol is to be used in the form of molded pipe sections having a durometer A hardness value of about 75 or higher, it may be desirable to add conventional fungicides, e.g., copper-8-quinolinolate, mildewcides, e.g., zinc naphthenate or rat repellants, e.g., trinitrobenzene, in amounts of about 1 percent of plasticizer weight. In preparing such pipe sections by molding operations, it may be desirable to employ mold release waxes or grease to facilitate parting from the mold parts, these waxes and greases including alkali metal and alkaline earth stearates, dicetyl ether and spermaceti wax.

An advantage of the plastisol compositions of the present invention which contain at least 62.5 percent resin, the remainder being liquid dispersant which is substantially non-volatile at the fusion temperature, lies in the fact that enhanced resistance to swelling by aliphatic hydrocarbons and petroleum oils appears to be achieved in a new manner by the addition of triethylene glycol dimethacrylate viscosity depressing agent. It has been found that the viscosity depressing action of triethylene glycol dimethacrylate agent is not maintained if mixed with substantial amounts of hydrocarbon secondary plasticizers such as Panaflex BN, Sovaloid C and Conoco H3100. In fact, when from 50 to 150 percent of petroleum hydrocabon plasticizer based upon the weight of the viscosity depressing agent is present, the initial viscosity depression is substantially impaired and instead of observing a viscosity depression in the order of 50 to 85 percent, a viscosity depression of only 5 to 10 percent is observed.

Secondary plasticizers which may be employed thus specifically exclude petroleum hydrocarbon derivatives even though these hydrocarbons have heretofore been observed to function per se quite effectively as viscosity depressing agents. The secondary plasticizers which may be employed are thus substantially limited to polyethylene glycol esters mentioned hereinbefore.

In this connection, the viscosity reducing action which is afforded in accordance with the invention is far greater than that which can be achieved by use of secondary plasticizer ingredients such as the aforementioned polyethylene glycol esters. The coss-linking polymerization of the viscosity reducing agent of the invention maintains the hardness of the fused plastisol in contrast to a loss of hardness and tensile strength which is observed when the same amount of said secondary plasticizer is employed.

The advantage of avoiding a viscosity reducing agent which is water soluble is an important one, particularly where semi-rigid fused products are employed which are in contact with water. Where water soluble ingredients are employed in significant amounts, e.g., from 1 to 5 percent of the plastisol, the aging of the fused products appears to bring about a loss in tensile strength and a loss in hardness due to the leaching of water soluble components from the composition. This disadvantage is entirely eliminated by the present invention.

Thus, the essential requirement of achieving good flow properties during forming operations which can be readily and rapidly carried out to provide coated or molded objects which are true in form, free from surface defects and completely homogeneous is achieved in a new way and is uniquely adapted to provide diffused compositions having enhanced resistance to aliphatic and aromatic hydrocarbons at resin proportions of above about 62.5 percent, a characteristic which has not hitherto been attainable to the high standard of resistance which is achieved by the invention.

Large quantities of vinyl chloride polymer plastisols are consumed in slush and rotational molding. This procedure is used in a large scale for producing dolls, doll parts, hollow balls and many industrial products. The advantages of slush and rotational molding lie in the high production speeds which may be obtained, the low cost of molding equipment and the ease of control of thickness of the products which are fabricated. The molding technique consists in depositing a layer of paste on the inside of a hollow mold, fusing the layer and then removing the product. In general, two types of cured products are produced, a first type which is a flexible elastomer, and a second type which is semi-rigid.

In slush molding the surface of the mold is wetted with plastisol, care being taken to prevent entrapment of air and the film cured. The one-pour method of slush molding places the mold on a conveyor, passes it through a heated oven or through hot water to gel the plastisol. The thickness of the gel layer is controlled by the quantity of heat transferred by the mold, the gelling characteristics of the plastisol, and temperature. After the desired thickness is obtained, the mold is inverted and liquid plastisol permitted to drain. The conveyor next carries the mold into a second heating chamber where the gel deposit is fused.

In the two-pour method, the mold is drained without heating before passing into the gelling oven, only a thin coating of plastisol being formed, and the hot mold after emerging from the gelling oven with its partially fused paste is refilled with plastisol, then dumped and drained.

The procedure of the invention permits the addition of viscosity depressant agent to provide better product quality and greater thicknesses of product in both the one-pour and two-pour methods of slush molding. By virtue of the fact that lower viscosity at higher vinyl chloride resin solids is obtained, greater thicknesses of gelled layer are obtained during the first stage. This, therefore, permits a wider variety of products in greater thicknesses to be produced by the molding procedure. In addition, improved high temperature tear strength cuts rejects using the viscosity depressant.

One of the principal difficulties which requires careful attention to operational control in both the one-step and two-step slush molding methods is concerned with the elimination of air from the molding forms during the mold filling operation. By virtue of the fact that the viscosity is lowered by as much as 84 percent of the original viscosity value from the addition of up to about 12 parts of triethylene glycol dimethacrylate viscosity depressing agent to the high vinyl chloride paste plastisol composition, the elimination of bubbles is greatly enhanced and in certain instances it is possible to dispense completely with deaerating operations. It is desirable to deaerate just before using the plastisol since polyethylene glycol dimethacrylates are stable in the presence of oxygen.

The operation in accordance with the invention has the advantage of eliminating a substantial amount of rejects during slush molding operations.

Rotational molding or casting for manufacture of hollow objects is usually carried out by charging a split mold with a great amount of plastisol, closing the mold, heating the plastisol to the fusion temperature while simultaneously rotating the mold through two or more planes to distribute the plastisol evenly on the mold wall.

After the fusion temperature, the mold is cooled, opened, and the finished article removed.

Wall thicknesses of the articles prepared by rotational molding depend to a great extent on the plastisol composition which is employed. It is in this aspect that the invention is particularly adapted to improve rotational molding operations since the viscosity of about 3,000 to 15,000 centipoises which is the requirement for the plastisol in this operation can be achieved with plastisol paste compositions containing much larger amounts of vinyl chloride polymer than heretofore were usable. The addition of the viscosity depressing agent of the invention not only provides low viscosity but also appears to lower the yield value and promote flow, thereby permitting treatment of thicker sections at viscosity ranges of about 10,000 to 13,000 centipoises in compositions having substantially lower amounts of liquid dispersant therein.

In this respect, it is noted that many of the molded as well as coated products may be required to be subjected to a further embossing procedure. By virtue of the fact that the triethylene glycol dimethacrylate viscosity reducing agent of the present invention is in itself cross-linked during the fusion operation, and even though this cross-linking does not appreciably upgrade the hardness of the final product, there is achieved a gellation during the early and intermediate stages of the fusion process which permits better flow control with better surface characteristics. The improved surface appearance which is noted when the viscosity reducing agent of the present invention is employed with this high vinyl chloride resin solids plastisol provides for improved embossed products.

In rigid rotational molding it is desired to use a blend of resin such as Geon resin 121 and Geon resin 202 whereby maximum solids are obtained. In place of organic viscosity reducing agents and low viscosity petroleum derivatives which have heretofore been employed in order to decrease the room temperature viscosity of the plastisol, the addition of critical amounts of triethylene glycol dimethacrylate viscosity reducing agents in accordance with the invention eliminates procedural difficulties during the molding operation. Specifically, there is prevented the vaporization of the volatile petroleum derivatives and there is substantially eliminated the softening effect or water sensitivity which is observed frequently where organic viscosity reducing agents or water soluble viscosity reducing agents have been heretofore employed.

The invention is further illustrated in the following examples:

EXAMPLE I

*Plastisol for Use as a Reverse Roll Coating*

| | |
|---|---:|
| Geon 121 (polyvinyl chloride) | 100 |
| Octyl diphenyl phosphate | 30 |
| Dioctyl sebacate | 12 |
| Titanium dioxide | 10 |
| Antimony trioxide | 5 |
| Barium-cadmium stabilizer [1] | 1 |
| Polymeric methyl 9-10 epoxy stearate stabilizer | 6 |
| TEDMA (triethylene glycol dimethacrylate) | 10 |
| | 174 |

[1] 50/50 mixture of barium ricinoleate and cadmium 2-ethyl hexoate.

EXAMPLE II

*Plastisol for Use as Slush Molding Composition*

| | |
|---|---:|
| Geon 121 (polyvinyl chloride) | 50 |
| Geon 202 | 50 |
| Di-2-ethyl hexyl phthalate | 50 |
| TEDMA (triethylene glycol dimethacrylate) | 10 |
| Advastab T671 [1] | 2.3 |
| | 162.3 |

[1] Advance Solvents & Chemical Corp., dibutyl tin laurate.

EXAMPLE III

*Plastisol for Use as Flexible Rotational Molding Composition*

| | |
|---|---:|
| Geon 121 (polyvinyl chloride) | 100 |
| Di-2-ethyl hexyl phthalate | 30 |
| Dioctyl adipate | 20 |
| TEDMA (trimethylene glycol dimethacrylate) | 10 |
| Zinc oxide filler (low oil adsorption) | 10 |
| Barium-cadmium stabilizer liquid [1] | 2 |
| Di-butyl tin laurate | 1 |
| | 173 |

[1] 50/50 mixture of barium ricinoleate and cadmium 2-ethyl hexoate in 50% concentration in inert solvent.

EXAMPLE IV

*Plastisol for Use as Rigid Rotational Molding*

(a) WITHOUT TEDMA STABILIZER

| | |
|---|---|
| Geon 121 (polyvinyl chloride) | 50 |
| Geon 202 | 50 |
| Di-2-ethyl hexyl phthalate | 20 |
| Liquid barium-cadmium stabilizer as in Example III | 3 |
| Advastab T671 (see Example II) | 2.3 |
| TEDMA (triethylene glycol dimethacrylate) | 5–10 |
| | 130.0 or more |

(b) WITH TEDMA STABILIZER (1) The same formulation as in Example IVa was made except that 100 parts of non-volatile sulfide per million parts of di-2-ethyl hexyl phthalate were added and the non-volatile sulfide was di-penta-methylene thiuram tetrasulfide which is effective in retarding polymerization of triethylene glycol dimethacrylate at temperatures below 150° F.

(2) The same formulation as in Example IV(b)1 was made except that a volatile sulfide was employed, di-ethyl sulfide in an amount of 100 parts per million of di-2-ethyl hexyl phthalate.

(3) The same formulation as in Example IV(b)2 was made except that 100 parts of di-methyl cyclohexyl amine per million parts of dioctyl phthalate was used as the stabilizer for triethylene glycol dimethacrylate.

EXAMPLE V

*Plastisols for Use as Rigid Molding*

(a) WITH POLYMERIC PLASTICIZER

| | |
|---|---|
| Exon 654-polyvinyl chloride | 100 |
| Polymeric methyl 9,10 epoxy stearate plasticizer | 20 |
| TEDMA (triethylene glycol dimethacrylate) | 13 |
| Liquid barium-cadmium stabilizer as in Example III | 3 |
| | 136 |

(b) WITH MIXTURES OF POLYMERIC PLASTICIZER

| | |
|---|---|
| Geon 121 (polyvinyl chloride) | 100 |
| Polymeric methyl 9,10 epoxy stearate plasticizer | 15 |
| Polymeric diethylene glycol adipate | 5 |
| TEDMA (triethylene glycol dimethacrylate) | 13 |
| Liquid barium-cadmium stabilizer as in Example III | 3 |
| | 136 |

(c) WITH MIXTURES OF POLYMERIC AND MONOMERIC PLASTICIZERS

| | |
|---|---|
| Geon 121 (polyvinyl chloride) | 100 |
| Polymeric methyl 9,10 epoxy stearate plasticizer | 15 |
| Tetraethylene glycol di-2-ethyl hexoate | 5 |
| Di-2-ethyl hexyl sebacate | 5 |
| TEDMA (triethylene glycol dimethacrylate) | 13 |
| Liquid barium-cadmium stabilizer as in Example III | 3 |
| | 141 |

(d) WITH MIXTURES OF POLYMERIC AND MONOMERIC PLASTICIZERS

| | |
|---|---|
| Geon 121 (polyvinyl chloride) | 100 |
| Polymeric methyl 9,10 epoxy stearate plasticizer | 15 |
| Di-2-ethyl hexyl sebacate | 5 |
| TEDMA (triethylene glycol dimethacrylate) | 13 |
| Liquid barium-cadmium stabilizer as in Example III | 3 |
| | 136 |

The invention is defined in the claims which follow.

I claim:

1. A plastisol comprising at least 62.5% and up to 82% by weight of polyvinyl chloride dispersion resin and about 18% to about 37.5% by weight of plasticizer and viscosity reducing agent, the percentages being based on the total amount of plasticizer, viscosity reducing agent and said polyvinyl chloride resin said polyvinyl chloride resin having an average particle size of 0.4 to about 0.9 micron, said liquid plasticizer comprising a mixture of di-2-ethyl-hexyl phthalate and methyl 9,10 epoxystearate and said viscosity reducing agent consisting of triethylene glycol dimethacrylate in an amount of from about 3 parts to about 12 parts per 100 parts of polyvinyl chloride dispersion resin, said amount reducing the initial viscosity of the plastisol without altering the hardness of the plastisol after fusing at elevated temperatures to the solid condition.

2. A plastisol comprising at least 62.5% up to about 82% by weight of polyvinyl chloride dispersion resin of particle size of 0.4 to about 0.9 micron in admixture with a liquid ester plasticizer and a viscosity reducing agent in an amount of about 18% to about 37.5% by weight, the percentage being based on the total amount of plasticizer, viscosity reducing agent and polyvinyl chloride resin, said viscosity reducing agent consisting of triethylene glycol dimethacrylate in an amount of about 3 parts to about 12 parts per 100 parts of polyvinyl chloride dispersion resin which reduces the initital viscosity of the plastisol without altering the hardness of the plastisol after fusing at elevated temperatures to a solid condition, and as a stabilizer, an aliphatic amine selected from the group consisting of diethylene triamine, triethylene tetramine and tertiary octylamine.

3. A plastisol as claimed in claim 2 wherein said stabilizer is present in an amount of 50 parts to 450 parts per million parts of liquid ester plasticizer.

References Cited in the file of this patent

UNITED STATES PATENTS

| | | |
|---|---|---|
| 2,562,204 | Milton | July 31, 1951 |
| 2,618,621 | Burt | Nov. 18, 1952 |
| 2,851,735 | Hogg et al. | Sept. 16, 1958 |
| 2,904,522 | Catlin et al. | Sept. 15, 1959 |
| 2,941,974 | Reymann et al. | June 21, 1960 |